(12) United States Patent
Goebel et al.

(10) Patent No.: US 6,216,066 B1
(45) Date of Patent: Apr. 10, 2001

(54) SYSTEM AND METHOD FOR GENERATING ALERTS THROUGH MULTI-VARIATE DATA ASSESSMENT

(75) Inventors: Kai Frank Goebel, Ballston Lake, NY (US); David Lacey Doel, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/108,359

(22) Filed: Jul. 1, 1998

(51) Int. Cl.$^7$ ............................... G06F 7/00; G06F 19/00

(52) U.S. Cl. ............................... 701/29; 701/33; 701/99; 702/179; 340/438; 340/439

(58) Field of Search .................. 701/14, 15, 16, 701/29, 33, 35, 99, 100; 702/179, 185; 706/900; 340/438, 439, 425.5, 426; 73/112, 117.1; 244/158 R

(56) References Cited

U.S. PATENT DOCUMENTS

| | | | |
|---|---|---|---|
| 4,037,782 | * | 7/1977 | Jackson . |
| 4,215,412 | * | 7/1980 | Bernier et al. ...................... 701/100 |
| 4,280,185 | * | 7/1981 | Martin .................................. 701/99 |
| 4,402,054 | * | 8/1983 | Osborne et al. ..................... 702/185 |
| 4,656,585 | * | 4/1987 | Stephenson ........................... 701/14 |
| 4,660,145 | * | 4/1987 | Hansen ................................. 701/14 |
| 5,018,069 | * | 5/1991 | Pettigrew .............................. 701/35 |
| 5,263,120 | * | 11/1993 | Bickel ................................. 704/200 |
| 5,406,502 | * | 4/1995 | Haramaty et al. ................... 702/183 |
| 5,408,412 | * | 4/1995 | Hogg et al. ............................ 701/33 |

OTHER PUBLICATIONS

SENSA TECHNOLOGIES, INC. HOME PAGE, 1998, internet address: http://www.jenanet.com/index.thm, 28 pages.*

"Ultra High–Tech Monitoring" Software that learns By Greg Napert, Aircraft Maintenance Technology, Mar. 1998, pp. 48–52.*

"Enhancing Aircraft Engine Condition Monitoring" by M. Fernandez–Montesinos, et al, IFAC Emerging Intelligent Control Technologies, Hong Kong, 1994, pp. 161–166.*

"Novel Self–Learning Fault Detection System for Gas Turbine Engines" by VC Aptel, et al., Univ. of Sheffield, United Kingdom, ACCC International Conference, pp. 867–872.*

"Troubleshooting CFM 56–3 Engines for the Boeing 747 Using CBR and Data–Mining" by Richard Heider, CFM International, pp. 512–518.*

"Contextual Normalization Applies to Aircraft Gas Turbine Engine Diagnosis" by P. Turney, et al, Journal of Appl Intel 3, Mar. 1993, p. 109–129.*

"Reasoning Technology for the On–Board Maintenance System" by L. Reibling, et al, 1993 IEEE, pp. 930–936.*

(List continued on next page.)

*Primary Examiner*—William A. Cuchlinski, Jr.
*Assistant Examiner*—Gertrude Arthur
(74) *Attorney, Agent, or Firm*—David C. Goldman; Jill M. Breedlove

(57) ABSTRACT

This invention provides a system and method for generating alerts through multi-variate assessment. A normalizer normalizes data obtained from a process. A classifier classifies the correlated data in a multi-dimensional space defined for the variables in the process. The normalized data are classified into a normal cluster indicative of normal operating conditions and at least one alert cluster each indicative of alert conditions. An alert verifier verifies correlated data classified as an alert condition. In another embodiment of this invention, a tracker is used for addressing drifting data sets that arise in the process over time which allows the adaptation of classifiers to the shifted state. In a third embodiment, the multi-variate generator is used in parallel with a trend performance analysis tool to validate alerts generated therefrom.

132 Claims, 11 Drawing Sheets

OTHER PUBLICATIONS

"A Performance Assessment of a Case–Based Diagnostic System for Aircraft Malfunctions" by Karamouzis, et al, pp. 71–78.*

"Case–Based Approach to Handling Aircraft Malfunctions" by S.L Karamouzis, et al, SPIE vol. 1963 Appl. of Art.L Intell. 1993, pp. 274—284.*

"ETS MBR Application of Model–Based Reasoning to Gas Turbine Diagnostics" by Winston, et al, 1995 Amer Assoc for Art Intell, p. 67–77.*

* cited by examiner

SYSTEM AND METHOD FOR GENERATING ALERTS THROUGH MULTI-VARIATE DATA ASSESSMENT

FIELD OF THE INVENTION

The present invention relates generally to trend performance analysis and more particularly to generating alerts for data obtained from a process through automated multi-variate data assessment.

BACKGROUND OF THE INVENTION

A trend performance analysis tool is typically used to monitor sensor data and parameter settings for a technical process. One type of technical process where a trend performance analysis tool is used is with aircraft engines. In this example, engine data are sampled from an airplane at different times of the flight and transmitted to a ground station. The data are collected and distributed to an aircraft engine expert for that particular airplane fleet. The data are preprocessed and evaluated by a trend performance analysis tool. In particular, the trend performance analysis tool monitors a multitude of engine variables. Data for each variable are compared against trending baseline data. If the data for a particular variable exceed a predetermined threshold limit and the data are not considered to be an outlier, then the trend performance analysis tool issues an alert. Typically, the predetermined alert threshold limit for each variable is set at a level that is below a limit that would generate a fault warning flag in the cockpit of the airplane. In particular, the predetermined alert threshold limit for each variable is at a level that would create an awareness of a potential problem before it turns into an event that could result in a revenue loss for the airplane. Examples of potential revenue loss situations are a grounding of an airplane, damage to an engine, departure delay, etc.

After an alert has been issued by the trend performance analysis tool, the aircraft engine expert examines trend charts for each of the variables in order to determine if an event has truly occurred which warrants further action. If the data in any of the trend charts are suspicious, then the aircraft engine expert notifies the fleet management of that particular airplane and suggests actions to further diagnose and/or actions to correct any causes for the alert. Examples of possible actions are borescoping the engine, engine washing, overhauling the engine, etc. A problem with this approach is that many alerts are generated which are false and do not warrant further diagnostic or corrective actions. There are a number of reasons for the high number of false alerts being issued. One is that the data quality varies considerably between different engines. Another reason is that predetermined alert threshold levels for a variable are preset globally and not selected for an individual airplane. Other reasons for issuing an excessive number of alerts are noise generated from poorly calibrated and deteriorating sensors, the use of faulty data acquisition systems, and slow wear of the engine which results in a constant change of normal operating conditions.

If too many alerts are generated, then the aircraft engine expert has to constantly examine the trend charts to eliminate the false alerts from the true alerts. Constantly examining the trend charts becomes a very time consuming task when there is a large number of engines to monitor as typically is the case for a large fleet of airplanes. In addition, the expert's senses may become dulled to the true alerts due to the large amount of false positive alerts. Therefore, there is a need for a system and method that produces less false positive alerts and can assist in reducing the excessive number of false alerts generated by a trend performance analysis tool.

SUMMARY OF THE INVENTION

This invention is able to generate alerts through simultaneous assessment of several engine variables and by learning changing system behavior. First, data are processed by normalization according to a set of normalization parameters. In particular, variables defined for the process are normalized individually. The normalized data for each process variable are then assessed simultaneously. In particular, multi-variate clustering is used to classify the normalized data in a multi-dimensional space defined for the process variables. The normalized data are classified into a cluster indicative of normal operating conditions and one or more alert clusters indicative of alert conditions. The clusters are of non-uniform and non-linear degrading size and shape. In particular, the boundaries between the clusters are non crisp, such that the degree of membership for a cluster is largest at the center. Data classified as being in one of the alert clusters are then verified to make sure that the data are not a false alert. Suspected alerts are verified by determining the level of vigilance for each reading. Each reading with a raised vigilance level is indicative of suspicious data. Each consecutive suspicious reading after the first suspicious reading raises the degree of vigilance. If a predetermined number of consecutive vigilance readings has been generated, then the suspected alert is considered to be a true alert and not a false alert. The cluster locations and shapes are then updated to account for slow system changes which are expected by the system, e.g., due to wear.

In accordance with one embodiment of this invention, there is provided a system and a method for generating alerts from data obtained from a process. In this embodiment, a normalizer normalizes the data. A classifier classifies the normalized data in a multi-dimensional space defined for variables in the process. The normalized data are classified into a normal cluster indicative of normal operating conditions and at least one alert cluster each indicative of alert conditions. An alert verifier verifies data classified as an alert condition.

In accordance with a second embodiment of this invention, there is provided a system and method for generating alerts from data obtained from a process. In this embodiment, a normalizer normalizes the data. A tracker tracks the normalized data for drifts that arise over time in the process. A classifier classifies the normalized data in a multi-dimensional space defined for variables in the process. The normalized data are classified into a normal cluster indicative of normal operating conditions and at least one alert cluster each indicative of alert conditions. An alert verifier verifies data classified as an alert condition.

In accordance with a third embodiment of this invention, there is provided a system and method for validating an alert generated from a trend performance analysis tool used to monitor data obtained from a process. In this embodiment, a normalizer normalizes the data monitored by the trend performance analysis tool. A classifier classifies the normalized data in a multi-dimensional space defined for variables in the process. The normalized data are classified into a normal cluster indicative of normal operating conditions and at least one alert cluster each indicative of alert conditions. An alert verifier verifies data classified as an alert condition. The verified alert condition is an indication that the alert generated from the trend performance analysis tool is valid.

DETAILED DESCRIPTION OF THE INVENTION

Figure 1:
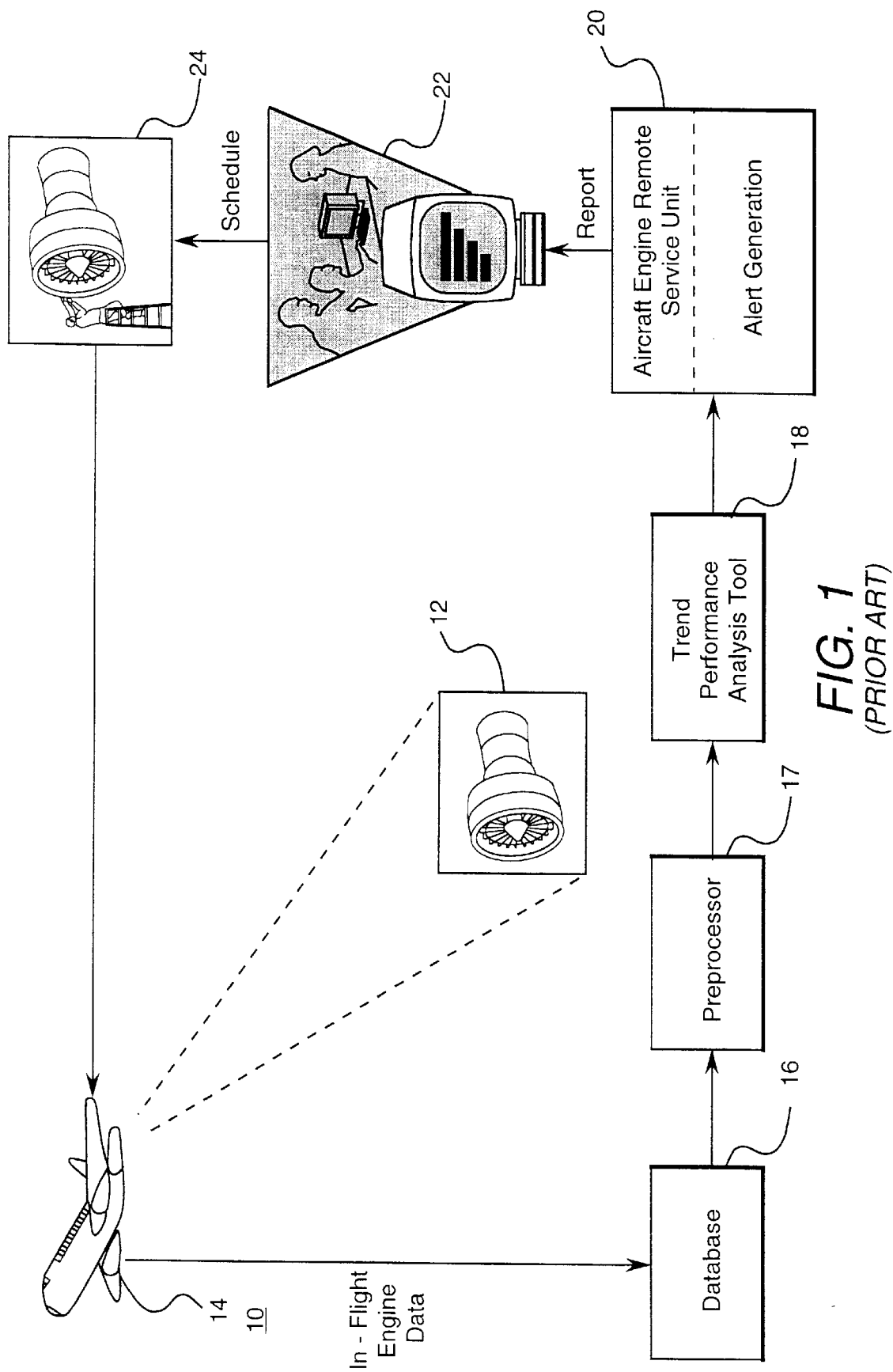
FIG. 1 shows a block diagram of a system for monitoring and maintaining an aircraft engine according to the prior art.

In this invention, the system and method for generating alerts through multi-variate data assessment are described with reference to an aircraft engine used by an aircraft such as an airplane. Although this invention is described with reference to an aircraft engine, the system and method for generating alerts can be used in conjunction with any system such as a turbine, a power system, a locomotive, a chemical or mechanical process plant, or another process which generates sensor data where it is desirable to monitor or diagnose system behavior. FIG. 1 shows a block diagram of a system 10 for monitoring and maintaining an aircraft engine 12 according to the prior art. In this system 10, engine data are sampled from the aircraft engine 12 from an airplane 14. The engine data are sampled at different times of the flight such as during the take-off, the climb and the cruise. The engine data are transmitted in flight to a centralized data center and stored in a database 16. The data are then collected, distributed and preprocessed by a preprocessor 17.

After preprocessing, the data are evaluated by a trend performance analysis tool 18 which monitors a multitude of engine variables. The trend performance analysis tool 18 may be any general purpose trend performance analysis tool that can monitor on-line sensor data and variables of a technical process. Data for each variable are compared against trending baseline data. If the data for a particular variable exceed a predetermined threshold limit, then the trend performance analysis tool 18 issues an alert to a remote service unit 20. An alert is indicative of a failure, a fault condition, or symptoms of an incipient failure condition. An aircraft engine expert located at the remote service unit monitors trend charts and alerts generated by the trend performance analysis tool 18. The aircraft engine expert then decides whether a true alert exists and generates a report to a fleet management unit 22. If the report suggests that remedial or diagnostic actions are needed, then personnel at the fleet management unit 22 prepare a schedule of the suggested actions. Maintenance personnel 24 then perform the actions (e.g., borescoping the engine, engine washing, overhauling the engine) as set forth in the schedule prepared by the fleet management unit 22.

As mentioned above, one of the problems associated with the system 10 for monitoring and maintaining an aircraft engine according to the prior art is that there are many alerts generated from the trend performance analysis tool 18 which are false and do not further diagnostic or corrective actions. When too many alerts are generated the aircraft engine expert has to constantly examine the trend charts to distinguish the false alerts from the true alerts. Constantly examining the trend charts is a very time consuming task for the aircraft engine expert, since the expert typically has the responsibility of monitoring a large number of engines for a particular fleet. In addition, it may cloud the expert's attentiveness for true alerts.

Figure 2:
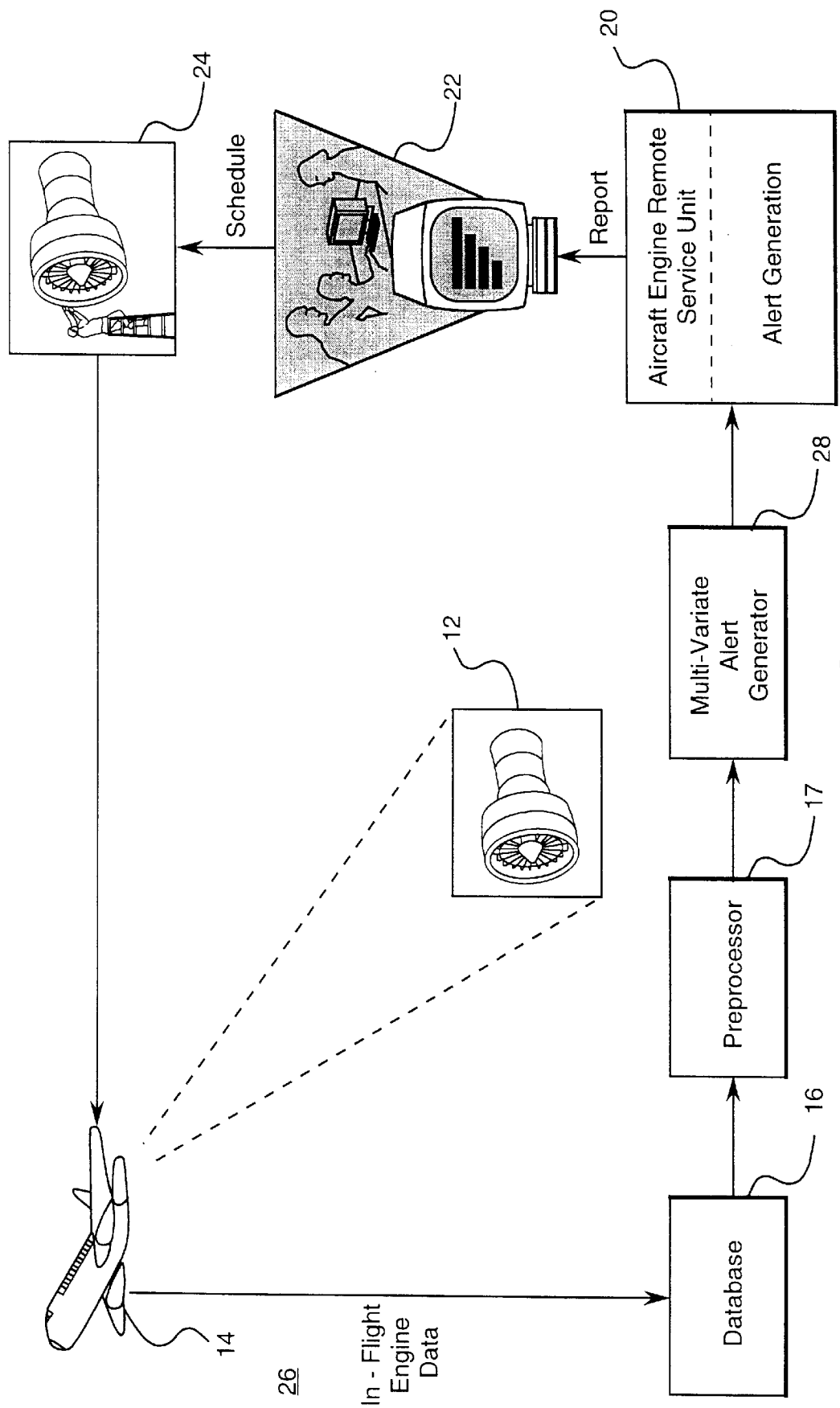
FIG. 2 shows a block diagram of a system for monitoring and maintaining an aircraft engine according to this invention.

FIG. 2 shows a block diagram of a system 26 for monitoring and maintaining an aircraft engine according to this invention. In this embodiment, false alerts are generated by a multi-variate alert generator 28. The multi-variate alert generator 28 first normalizes data obtained from the aircraft engine 12 according to an initialization set. In particular, variables defined for the aircraft engine are normalized individually. The aircraft engine variables that are normalized are delta exhaust gas temperature (dEGT), which is the deviation from the baseline EGT, fuel flow (WF), core speed (N2), and EGT divergence, which is the difference of the EGT between the mean of EGT of all engines and the EGT of the engine in question. These variables are illustrative of some of the aircraft engine variables that can be normalized in this invention and are not an exhaustive list. The multi-variate alert generator 28 assesses the normalized data for the aircraft engine variables simultaneously, instead of one process variable at a time. In particular, the alert generator 28 uses multi-variate clusters to classify the normalized data in a multi-dimensional space defined for the engine variables. The normalized data are classified into a normal cluster indicative of normal operating conditions and at least one alert cluster each indicative of an alert condition. The clusters are of non-uniform and non-linear degrading size and shape. Moreover, the boundaries between the clusters are non crisp, such that the degree of membership for a cluster is largest at the center. Data classified as being mostly in an alert cluster are then verified to make sure that the data are not a false alert. Alerts are verified by determining the level of vigilance for each reading. Each reading with a vigilance level is indicative of suspicious data. Each consecutive reading that falls mostly into the alert cluster after the suspicious reading raises a certain degree of vigilance. If a predetermined number of consecutive raised vigilance readings have been generated, then it is considered to be a true alert and not a false alert.

Figure 3:
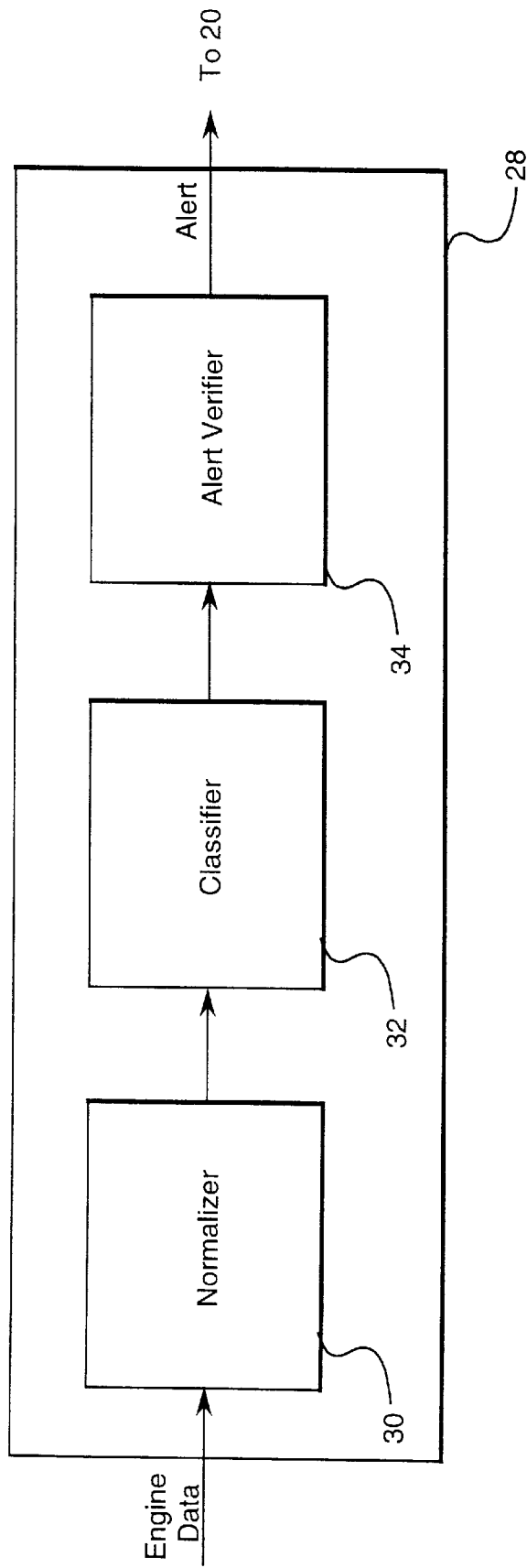
FIG. 3 shows a more detailed view of a multi-variate alert generator shown in FIG. 2.

FIG. 3 shows a more detailed view of the multi-variate alert generator 28. The multi-variate alert generator 28 comprises a normalizer 30 that normalizes engine variable data obtained from the database 16. A classifier 32 classifies the normalized data in a multi-dimensional variable space defined for the aircraft engine 12. Preferably, the multi-dimensional variable space comprises the dEGT, WF, N2, and EGT divergence variables. The classifier 32 classifies the normalized data into a normal cluster indicative of normal operating conditions and at least one alert cluster each indicative of alert conditions. An alert verifier 34 verifies the data classified as an alert condition. The aircraft engine expert located at the remote service unit 20 then generates a report to the fleet management unit 22 which suggests diagnostic and/or remedial actions to be taken. The normalizer 30, the classifier 32, and the alert verifier 34 of the multi-variate alert generator 28 are embedded in a computer such as a workstation. However other types of computers can be used such as a mainframe, a minicomputer, a microcomputer, or a supercomputer. The algorithms performed in the normalizer 30, the classifier 32, and the alert verifier 34 are programmed in VBasic, C++ and MATLAB, but other languages such as JAVA may be used.

The normalizer 30 normalizes the engine data individually for each engine variable (i.e., dEGT, WF, N2, and EGT divergence) according to normalizing parameters. In particular, a user specified, predetermined number of initial data readings for each variable which are validated to be "normal" (e.g., through supervision) are used to obtain the normalization parameters. All following data readings are then scaled according to the normalization parameters. While several normalization procedures can be used, the preferred one is governed by the equation:

$$x_{normalized} = \frac{x - x_{min}}{x_{max} - x_{min}} \qquad (1)$$

wherein $x_{normalized}$ is the normalized variable;

x is the raw reading;

$x_{max}$ is the maximum value of the data within the initialization set; and $x_{min}$ is the minimum value of the data within the initialization set.

Figure 4:
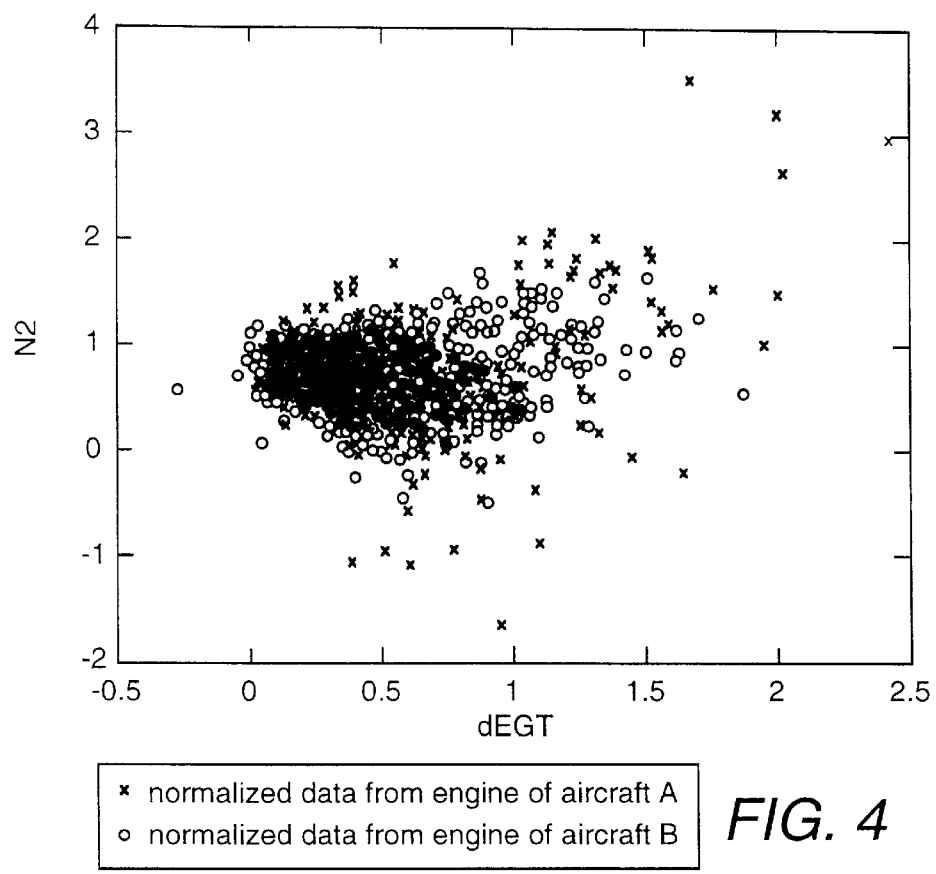
FIG. 4 shows the normalized data obtained from an aircraft A and the normalized data from an aircraft B.

Normalization of the engine data allows a comparison of data which are subject to different calibration or constraints like minor design variations or material variations. In the case of the aircraft engine example, it allows comparison of different aircraft engines that are in different states of wear and that have differently tuned variables. An underlying basis of the normalization is that particular failures have directional information which is retained over different engines and even engine families. For example, a variable bleed variable (VBV) failure results in increases of dEGT, WF, N2, and EGT divergence. On the other hand, a failure of a different component, e.g., a failure of a C-chip, will result in an increase of dEGT, WF, and EGT divergence, while N2 will drop. These characteristic changes can be seen regardless of the differences in wear or other variations mentioned above. The normalization also provides a role in initializing the clusters after engine changes, controller changes, major maintenance, etc. have been performed, which usually all involve the change of engine parameters. The normalization provides a semi-automated mechanism to calibrate the engine to new parameter settings. The first n data points, where n is a number to be specified by the user, have to be of type "normal" and have to be verified by the user. FIG. 4 shows the normalized data obtained from an aircraft A and the normalized data from an aircraft B.

Figure 5:
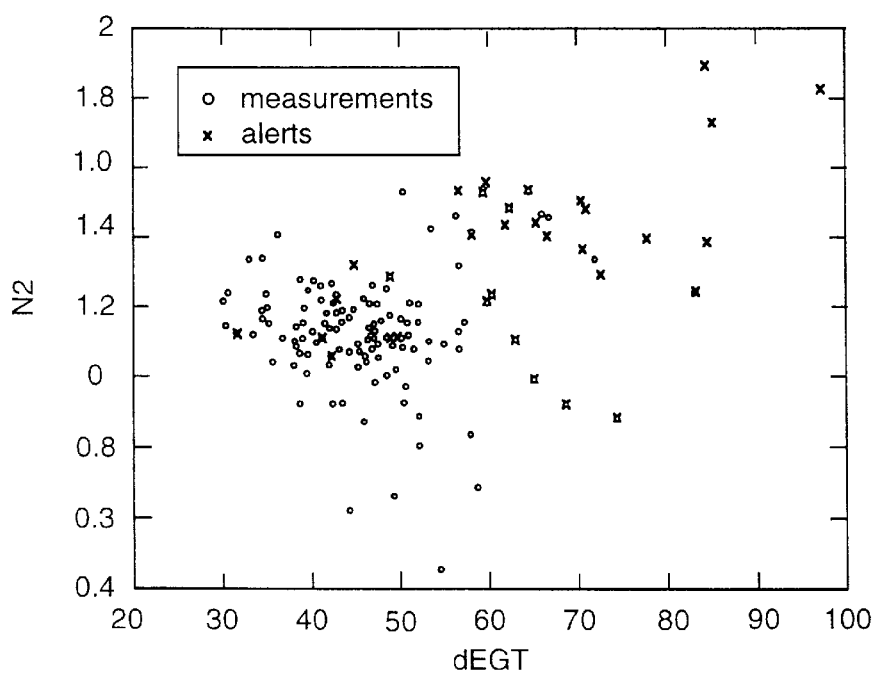
FIG. 5 shows a plot of some engine variables correlated with each other.

The classification of the normalized data in a multi-dimensional variable space by the classifier 32 takes advantage of partially redundant information inherent to the aircraft engine. For example, engine variables such as dEGT, WF, N2, and EGT divergence are correlated such that particular failure conditions for each show up in changes of several of the other variables. Thus, a rapid shift of dEGT, WF, N2, and EGT divergence will correlate into a characteristically different region. The presence of an alert condition, such as a rapid change of dEGT caused by a variable bleed valve (VBV) being stuck open, results in a change of some engine variables, which shows up in an alert cluster while normal behavior will appear in a cluster labeled "normal". FIG. 5 shows an example of some engine variable data plotted against each other. In particular, FIG. 5 shows dEGT data correlated with N2 data. Moreover FIG. 5 shows that when the engine variable data are plotted against each other, data of type "normal" and data of type "alert" fall largely into separate regions.

Figure 6:
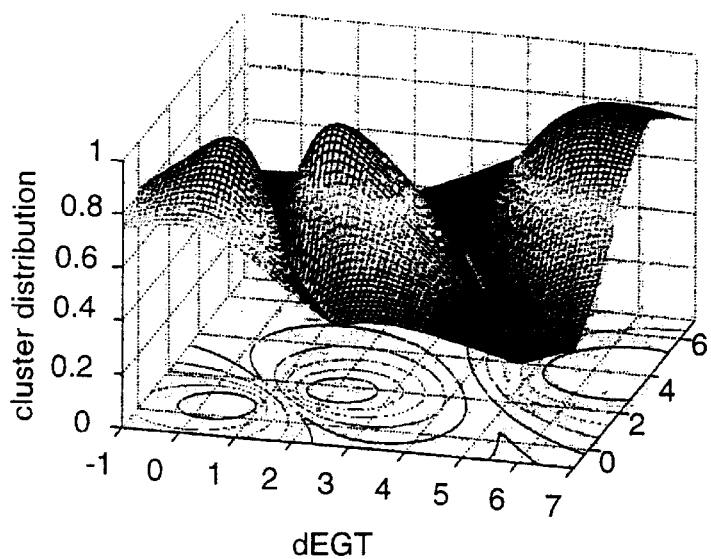
FIG. 6 shows an example of a fuzzy cluster distribution plot between engine variables.

In addition, it can be seen that data from the normal class and the alert class are found in an overlapping region. Therefore, the clusters from different classes in FIG. 5 are also overlapping. To resolve this ambiguity, the boundaries of the clusters are not crisp. Rather, cluster membership varies and is largest at the center and smaller further away from the center. The degradation is typically (but not necessarily) carried out in a non-linear decreasing slope. In the overlapping region, data are part of both classes. This gains a suppression of noise at the boundaries at the expense of solution crispness. There are a number of functions which perform this task. In this invention, fuzzy clusters are used, however, other techniques such as radial basis functions may be used. In a higher dimension space, the fuzzy clusters take the shape of an irregularly shaped hyper-ellipsoid. An example of a cluster distribution plot showing soft boundaries between engine variables is shown in FIG. 6.

The classifier 32 uses fuzzy clustering techniques such as fuzzy k-means and fuzzy knn clustering to provide a soft boundary of any cluster. Fuzzy k-means clustering classifies incoming data partially into k clusters, wherein the degree of belonging to a cluster is based on the distance to the cluster centroid. For example, incoming data that are closest to one of the k-clusters will have the highest degree of belonging to that particular cluster, while clusters further away from the data will have a lower degree of belonging. Fuzzy knn-clustering assigns degrees of belonging to a class by finding the minimum distance of the incoming data to the k nearest neighbors of a cluster. An advantage of using one of these fuzzy clustering techniques is that it provides a more favorable response in the presence of noise because misclassifications are avoided when the boundary to a cluster is tripped.

Using Ruspini's approach, fuzzy k-means clustering is based on minimization of an objective function which is defined as:

$$\min J(U, V) = \sum_{j=1}^{n} \sum_{i=1}^{k} (u_{ij})^m d^2(x_j, v_i), \qquad (2)$$

wherein:

U is a set of a fuzzy k-partition of the data set;

V is a set of k prototypes;

x is the feature vector of the normalized data;

v is the centroid of a cluster;

u is the degree of membership $x_j$ in cluster i;

m is a weighing component which controls the fuzziness of the cluster;

$d^2(x_j, v_i)$ is an inner product metric (e.g., distance) between $x_j$ and $v_i$;

n is the number of data points; and k is the number of clusters.

The classifier 32 uses a clustering algorithm to choose the initial number of clusters, k, and the initial position of these classes. Next, the degree of membership for all data is determined by using the following equation:

$$u_{ij} = \frac{\left(\frac{1}{d^2(x_i, v_j)}\right)^{\frac{1}{m-1}}}{\sum_{k=1}^{n}\left(\frac{1}{d^2(x_k, v_j)}\right)^{\frac{1}{m-1}}} \quad (3)$$

Next, a new centroid $v_i$ is determined using the following equation:

$$v_i = \frac{\sum_{j=1}^{n}(u_{ij})^m x_j}{\sum_{j=1}^{n}(u_{ij})^m} \quad (4)$$

At this point the $u_{ij}$ are updated again and the cycle is repeated until a stopping criterion such as $$\sum_{j=1}^{k}\sum_{i=1}^{n}(u_{ij} - u_{ij_{new}})^2 < \varepsilon \quad (5)$$

is obtained.

For the fuzzy knn classifier, first the distance from the input vector to the closest neighbor is found. If the number of k neighbors has not yet been established, the closest neighbor is included in the set of k-nearest neighbors. If there are already k-nearest neighbors and the newly found neighbor is closer to the input vector than the farthest nearest neighbor, then the farthest nearest neighbor is replaced by the newly found nearest neighbor. This process is repeated until all data points are evaluated. Then the membership is assigned to all k nearest neighbors using $$u_i(x) = \frac{\sum_{j=1}^{k} u_{ij}\left(\frac{1}{d^2(x, x_j)}\right)^{\frac{1}{m-1}}}{\sum_{j=1}^{k}\left(\frac{1}{d^2(x, x_j)}\right)^{\frac{1}{m-1}}} \quad (6)$$

wherein x is the feature vector;

$x_j$ is one of the nearest neighbors;

$u_i$ is the degree of membership of $x_j$ in cluster i;

$u_{ij}$ is the membership of the j-nearest neighbor in cluster I (based on distance from cluster mean or crisp);

m is a weighing component which controls the fuzziness of the cluster;

$d^2(x,x_j)$ is an inner product metric (e.g., distance) between x and $x_j$;

k is the number of clusters; and the other variables are as in the fuzzy k-means approach.

The fuzzy clustering can be thought of as compiled rule-based system having a plurality of rules for determining the status of the engine from the engine variables. An example of one such rule could be:

If the dEGT goes up and the fuel flow WF goes up and the core speed N2 goes up and the EGT divergence goes up, then the reading is suspicious and therefore an alert is generated. If the reading is closer to the center of the "alert" cluster, it will produce the alert with more confidence than at the edge. Confidence is expressed as membership to any of the clusters.

The alert verifier 34 verifies the data classified as an alert by using a digital filter. The digital filter forces the reoccurrence of several suspicious readings (i.e., data in an alert cluster). In particular, if only one suspicious reading is encountered, then the alert verifier 34 generates a vigilance level flag. If a second suspicious reading is encountered immediately afterwards, then the alert verifier 34 forces the vigilance level flag to go up. Otherwise, if the next reading is normal, then the vigilance level goes down. In this case, the first suspicious reading is treated as an outlier and no remedial action is recommended. If a third consecutive suspicious reading is encountered, then the alert verifier 34 forces the vigilance level flag further up. After a predetermined number of vigilance flags have been generated, then this is an indication that this is a true alert. Preferably, three is the predetermined number of vigilance flags that would generate a true alert, however, this number can be adjusted per user specifications. Once the alert verifier 34 determines that there is a true alert, then a report is generated and diagnostic and/or remedial action(s) are suggested by the aircraft engine remote service unit 20 and the fleet management unit 22, respectively.

Figure 7:
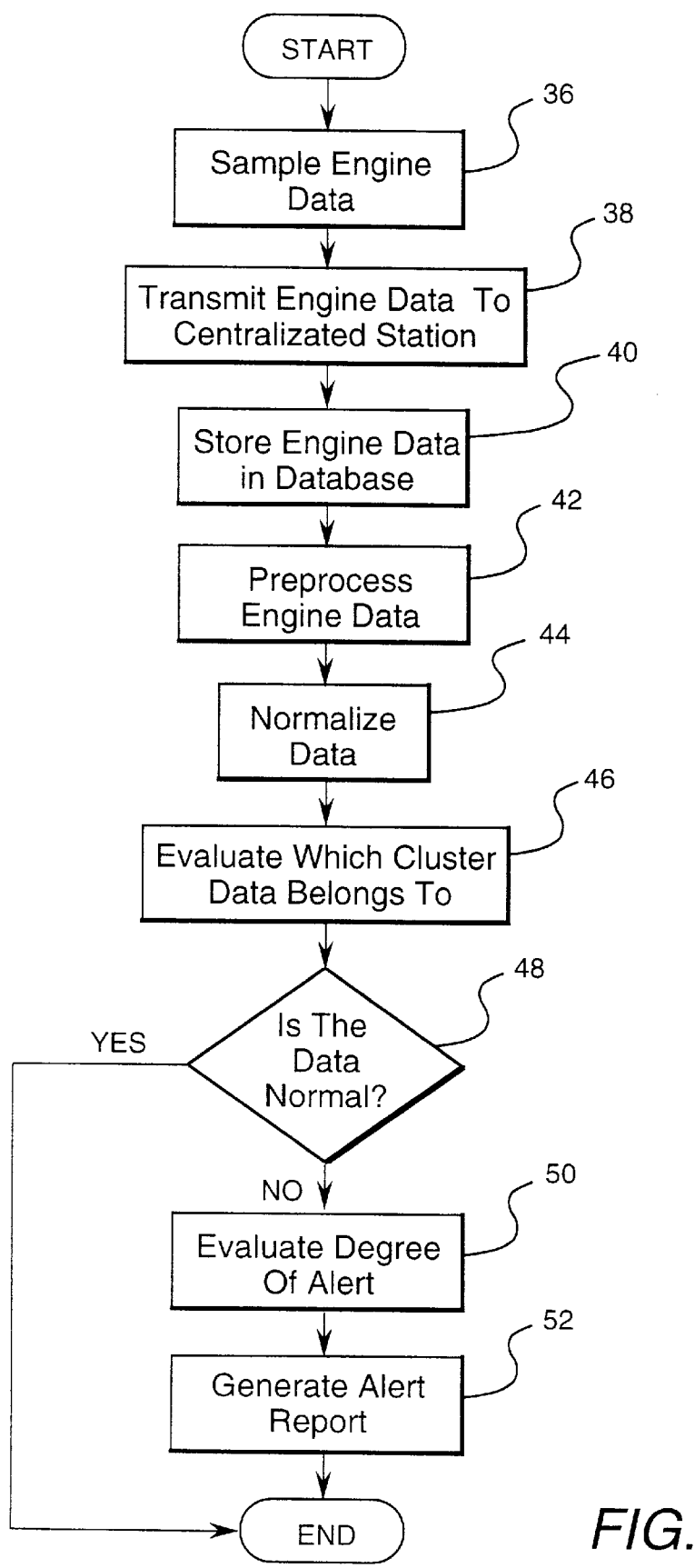
FIG. 7 shows a flow chart setting forth the steps performed by the system shown in FIG. 2.

FIG. 7 shows a flow chart setting forth the steps performed by the aircraft engine monitoring system 26 shown in FIG. 2. Engine data are sampled from the aircraft engine at 36 at different times of the flight such as during take-off, climb and cruise. The engine data are transmitted to a centralized data center system at 38 and stored in a database at 40. The data are preprocessed at 42 by scaling the data for each engine variable to a baseline mode. After preprocessing, the data are evaluated by the multi-variate alert generator 28. In particular, the engine data are normalized individually for each engine variable according to normalizing parameters at 44. Next, the data are evaluated at 46 to determine to which degree the data belong to the clusters. If the confidence that the data does not belong primarily to the normal cluster at 48 is high, then the degree of alert or level of vigilance is determined at 50. After the degree of alert has been determined, then an alert report is generated at 52. The alert report is used by an aircraft engine expert who then suggests appropriate diagnostic and/or remedial actions. A schedule of actions is then prepared and used by maintenance personnel.

In another embodiment of this invention, the multi-variate alert generator 28 is implemented with a tracker for addressing drifting data sets that arise from a changing environment. Drifting data sets are a problem that is frequently encountered in trend performance analysis. A problem with drifting data sets is that it is difficult to classify the data. Often times, the location and shape of a data cluster will change with time due to the dynamic nature of the aircraft engine process. Normal wear such as progressive material abrasion as a result of friction, material changes due to heat, particle deposition and contamination restricting flow, chemical material changes due to oxidization are some examples of factors that cause the normal operating conditions for a particular state of wear to change over time. Therefore, the cluster shape and location changes over time as well. Alerts are still seen as relatively sudden changes of the variables which are measured as deviations from the (slowly changing) normal state.

Figure 8:
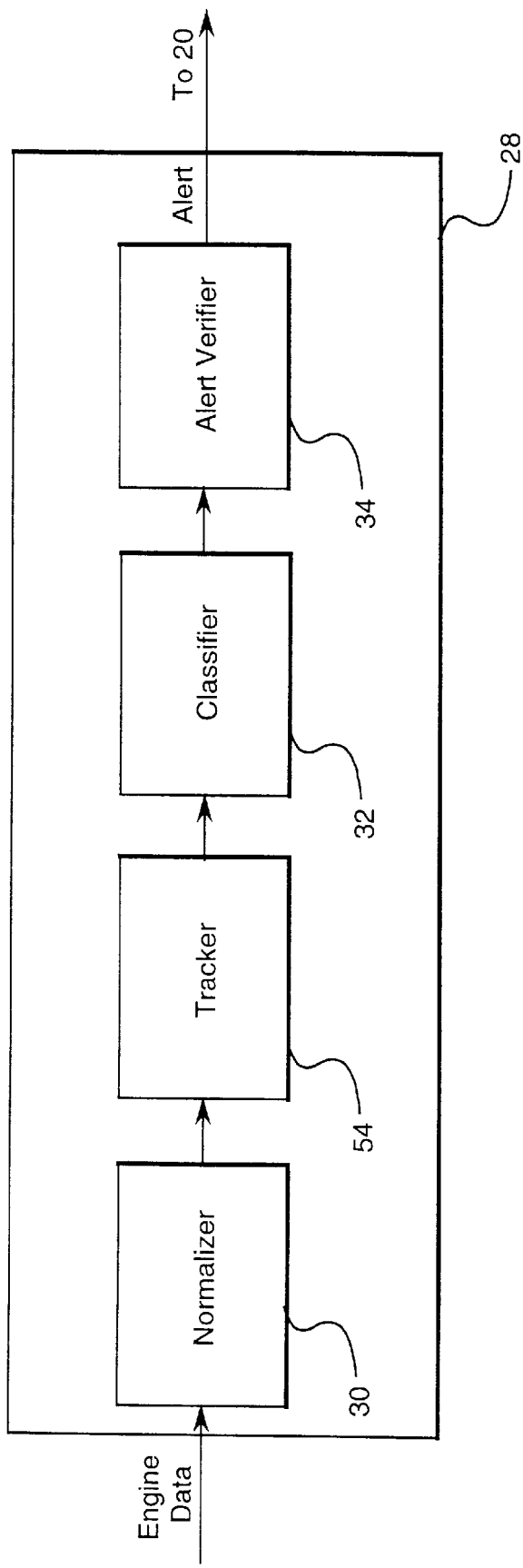
FIG. 8 shows an alternative embodiment of the multi-variate alert generator shown in FIG. 3.

FIG. 8 shows the multi-variate alert generator 28 implemented with a tracker 54. Preferably, the tracker 54 is located between the normalizer 30 and the classifier 32. The tracker 54 contains algorithms to adapt the shape and location of clusters. In particular, it is able to track slow drifts that arise from normal wear patterns, while retaining the ability to classify incoming data into the different clusters. The tracker is able to adapt the shape and location of clusters by first updating the memberships in the normal and alert clusters using the above mentioned Ruspini (k-means) approach, which determines membership values and cluster centers. No longer following Ruspini, the adaptation of the fuzzy cluster is determined by using the following:

$$v_{new_{winner}} = v_{old_{winner}} + \alpha_{winner}\left(\frac{\sum_{i=1}^{n} u_{winner_i}^m x_i}{\sum_{i=1}^{n} u_{winner_i}^m} - v_{old_{winner}}\right), \quad (7)$$

wherein:

$x_i$ is the data point under consideration;

n is now the number of data of a sliding window over which to evaluate the membership of the clusters;

$v_{new_{winner}}$ is the new cluster position;

$v_{old_{winner}}$ is the old cluster position;

$\alpha_{winner}$ is the adaptive learning coefficient which is determined as follows:

$$\alpha_{winner} = \beta(1-|2u_{winner}-1|), \quad (8)$$

wherein $u_{winner}$ is the membership value of the winning cluster; and $\beta$ is a small learning constant; $0<\beta<1$. The adaptation of $\alpha_{winner}$ attempts to minimize the ambiguity in any given situation. More specifically, for two clusters, when the degree of belonging to a class is medium (ambiguous), $u_{winner}$ and $u_{loser}$ (the membership value of the losing cluster) are almost the same. In this case, $\alpha_{winner}$ becomes the largest cluster, thus attempting to untangle the indeterminate situation. For more than two clusters, since $$\sum_{j=1}^{k} u_{ij} = 1 \quad (9)$$

it follows that $$u_g = 1 - \sum_{\substack{j=1 \\ j \neq g}}^{k} u_{ij} \quad (10)$$

and therefore $$\alpha_{winner} = \beta\left(1-\left|u_{winner}-\left(1-\sum_{\substack{j=1 \\ j \neq winner}}^{k} u_{ij}\right)\right|\right) \quad (11)$$

let $u_g = u_{winner}$ thus $$\alpha_{winner} = \beta(1-|2u_{winner}-1|) \quad (12)$$

Instead of minimization of ambiguity, $\alpha_{winner}$ can be set to be constant or another suitable criterion can be used.

The new cluster position reflects now the updated system state. In other words, it has adapted to the changed environment. New incoming data are then evaluated against the new cluster positions. This learning capability allows the tracking of system behavior not only when the system trajectory is known but in particular also when the behavior is hard or impossible to predict.

Figure 9:
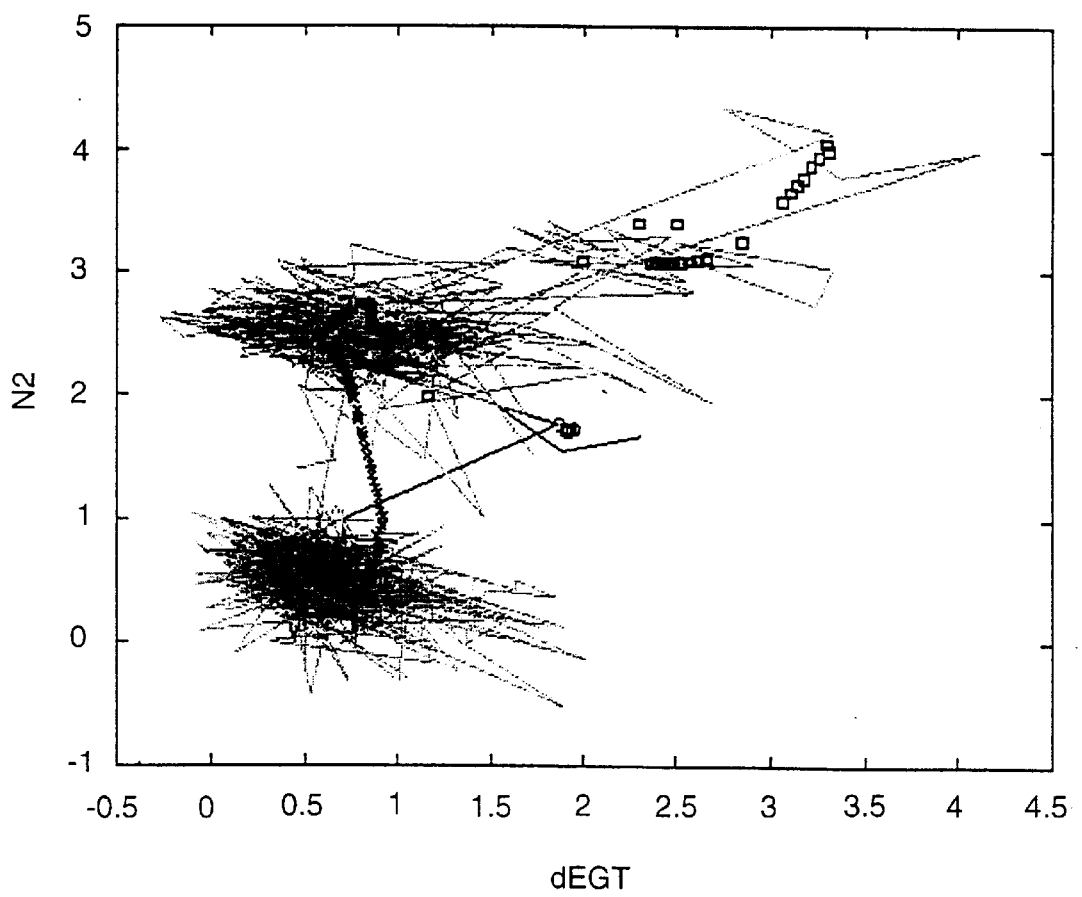
FIG. 9 shows a graph of the tracking of two aircraft engine variables over a period of time according to the embodiment shown in FIG. 8.

FIG. 9 shows the tracking capability of the tracker 54 showing dEGT versus N2 data over a period of nine months including a software change resulting in a shift of the "normal" behavior. The "x" show the centroids of cluster "normal" and the boxes show the centroid of the cluster "VBV alert". Over the observation period, the cluster centroid is updated first slowly, then after the change of the software, it is able to adapt to the new environment at the higher N2 as well without confusing the alert cluster with the normal cluster. Part of the reason is that there are two more dimensions (WF and EGT divergence) which are being evaluated. Only when a true alert condition occurs does the alert cluster adapt its position.

If the knn approach is chosen for classification (instead of the kmeans approach), then the adaptation is accomplished by using a moving window over each data class which discards data older than the size of the window.

Figure 10:
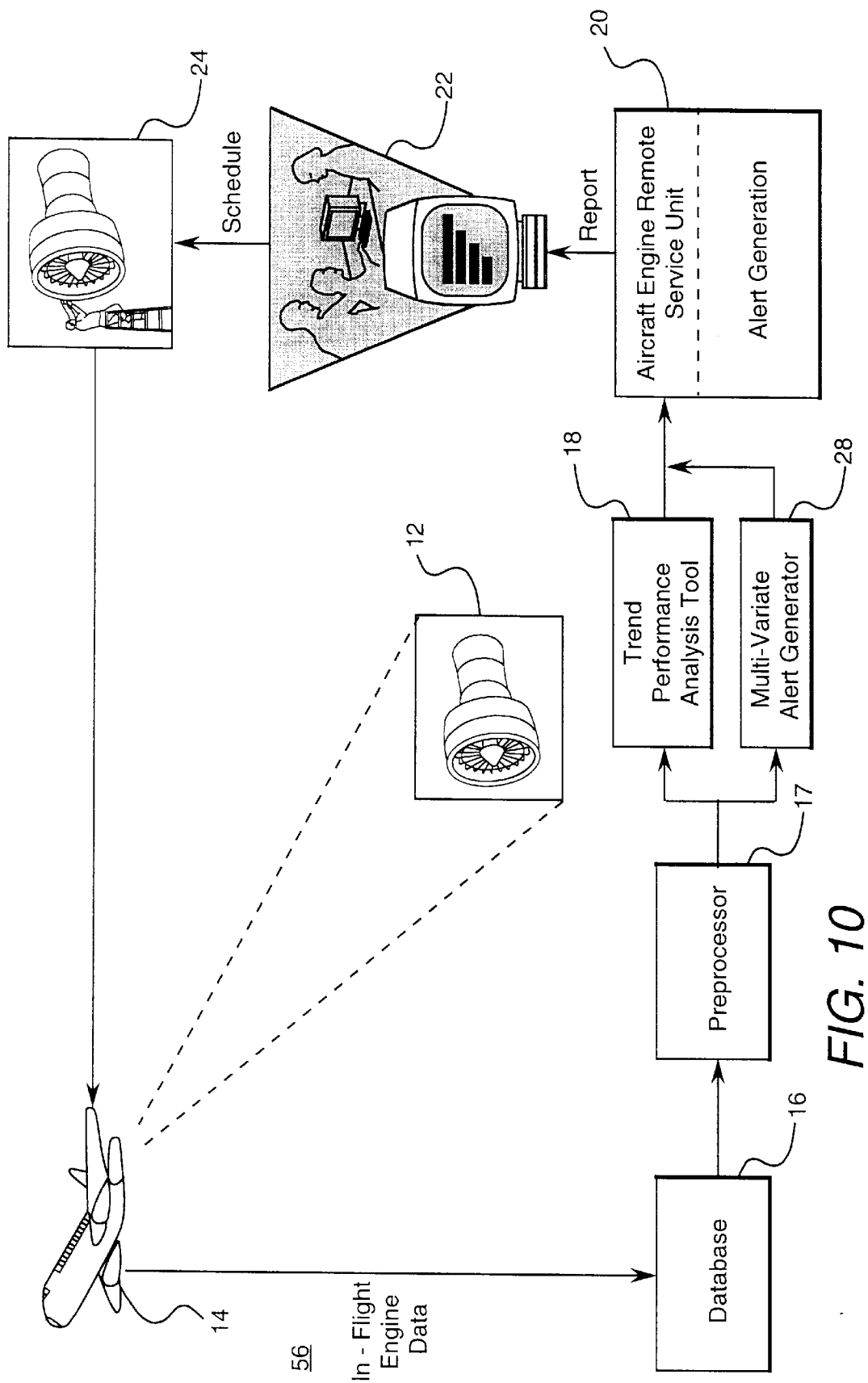
FIG. 10 shows a block diagram of a system for monitoring and maintaining an aircraft engine according to another embodiment of this invention.
Figure 11:
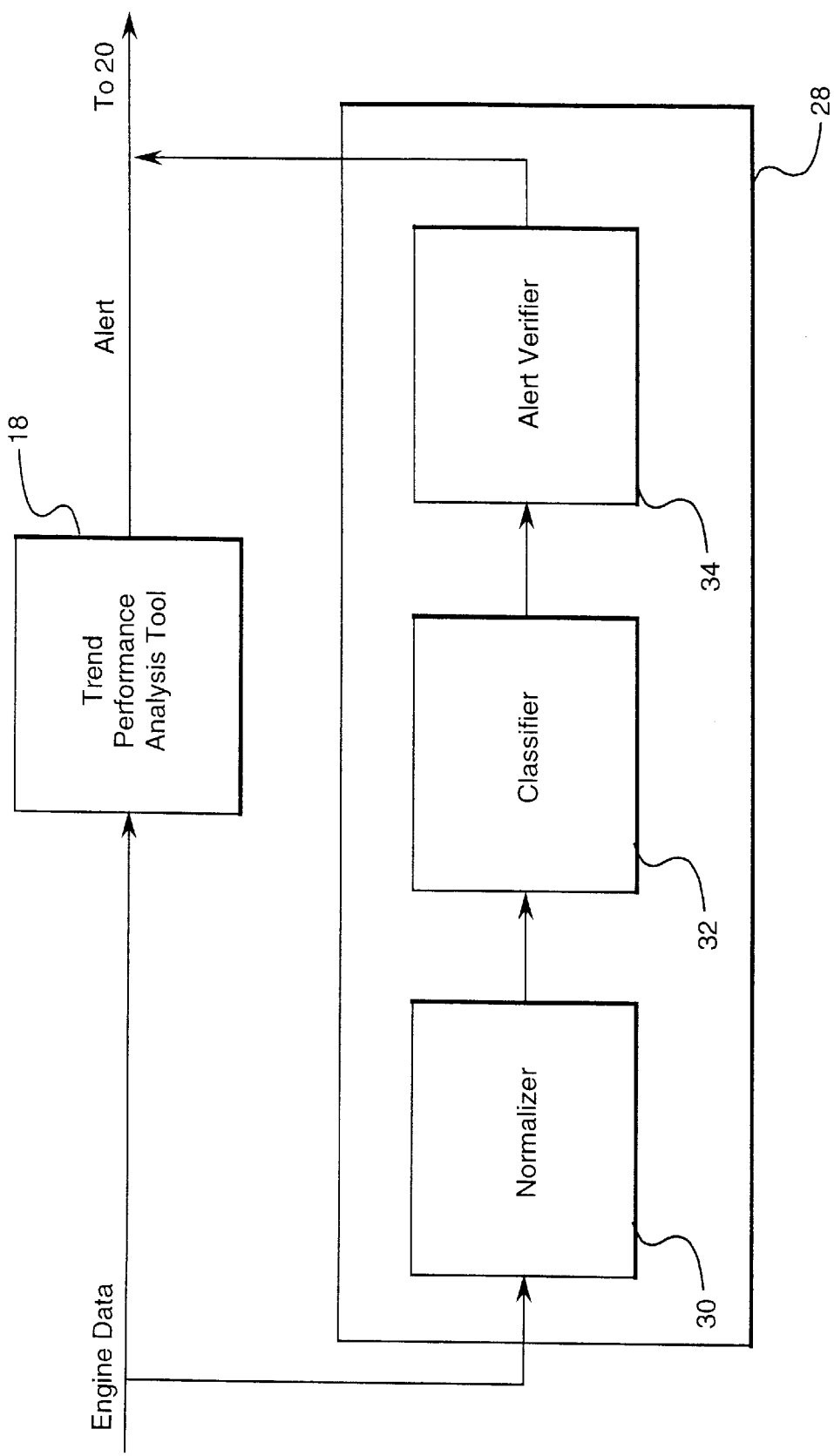
FIG. 11 shows a more detailed view of the multi-variate alert generator used for validating alerts in a trend performance analysis tool.

In another embodiment of this invention, the multi-variate alert generator is used in conjunction with the trend performance analysis tool to validate alerts generated therefrom. FIG. 10 shows a block diagram of a system 56 for monitoring and maintaining an aircraft engine according to this embodiment. In this embodiment, the multi-variate alert generator works in parallel with the trend performance analysis tool 18, however, the multi-variate alert generator may be integrated into the tool. As in the embodiment set forth in FIG. 2, the multi-variate alert generator 28 normalizes data obtained from the aircraft engine 12 according to a initialization set. The multi-variate alert generator 28 then uses multi-variate clusters to classify the normalized data in a multi-dimensional space defined for the engine variables. Alerts are verified by determining the level of vigilance for each reading in the aforementioned manner. FIG. 11 shows a more detailed view of the multi-variate alert generator 28 used to validate alerts in the trend performance analysis tool.

Figure 12:
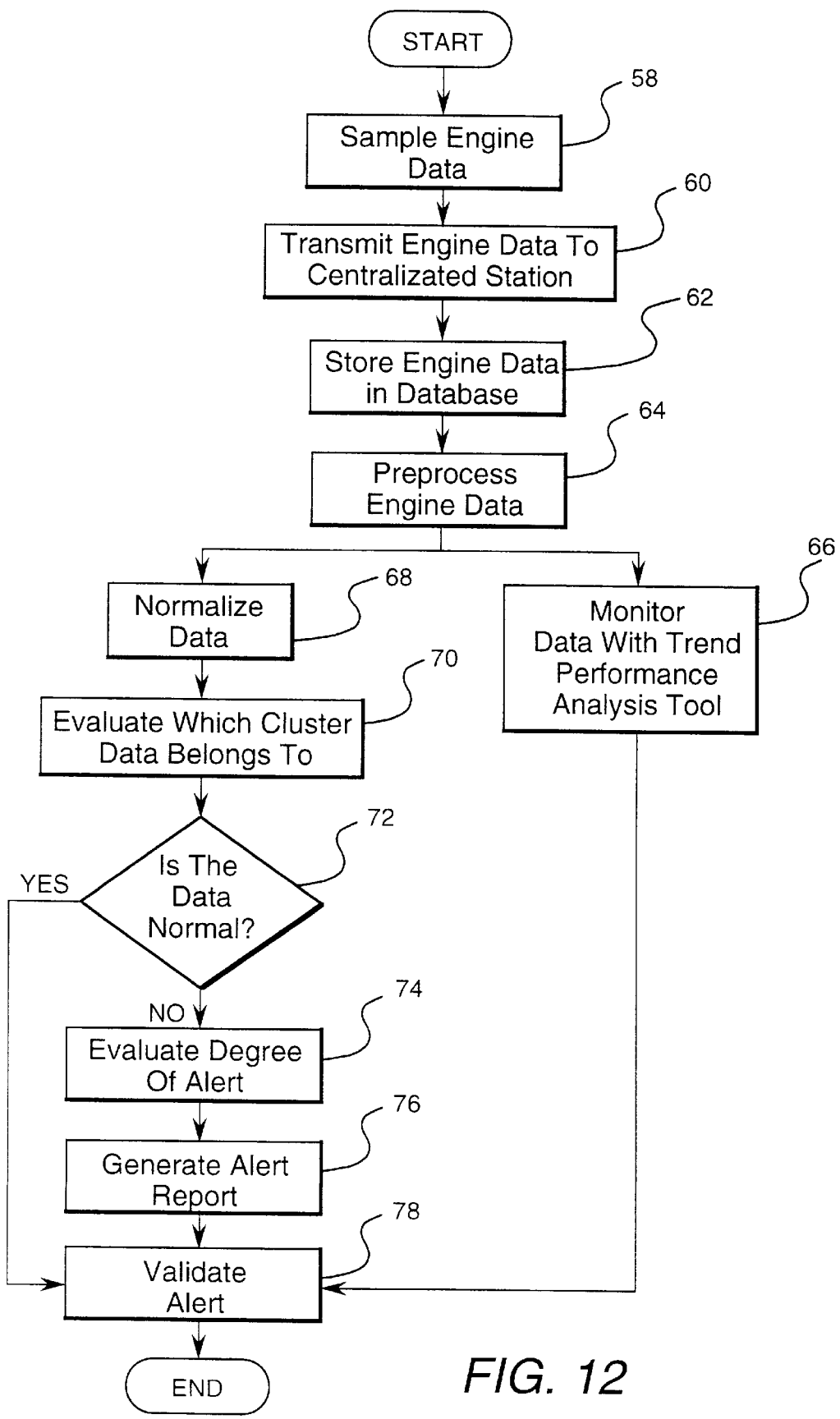
FIG. 12 shows a flow chart setting forth the steps performed by the system shown in FIG. 10.

FIG. 12 shows a flow chart setting forth the steps performed by the aircraft engine monitoring system 56 shown in FIG. 10. Engine data are sampled from the aircraft engine at 58 at different times of the flight such as during take-off, climb and cruise. The engine data are transmitted to a centralized data center system at 60 and stored in a database at 62. The data are preprocessed at 64 by scaling the data for each engine variable to a baseline mode. After preprocessing, the data are evaluated by the trend performance analysis tool at 66 where the data for each variable is compared against trending baseline data. If the data for a particular engine variable exceed a predetermined threshold limit, then the trend performance analysis tool issues an alert.

At the same time the engine data are being evaluated by the trend performance analysis tool, the data are simultaneously evaluated by the multi-variate alert generator. In particular, the engine data are normalized individually for each engine variable according to normalizing parameters at 68. Next, the data are evaluated at 70 to determine to which degree the data belong to the clusters. If the confidence that the data does not belong primarily to the normal cluster at 72 is high, then the degree of alert or level of vigilance is determined at 74. After the degree of alert has been determined, then an alert report is generated at 76. The alerts from the multi-variate alert generator and the trend performance tool are then validated at 78.

Figure 13:
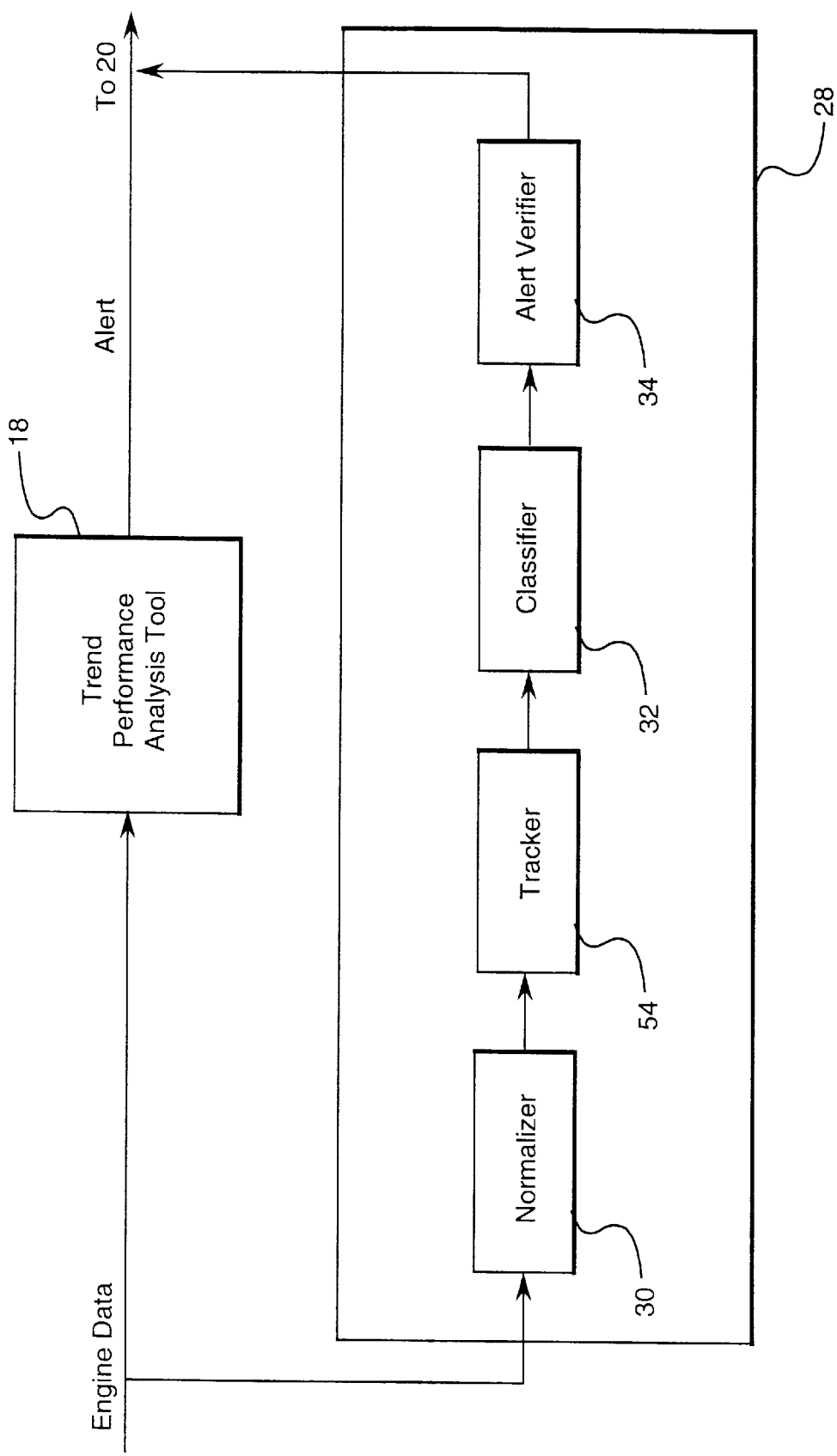
FIG. 13 shows another embodiment of the multi-variate alert generator in use with the trend performance analysis tool.

FIG. 13 shows another embodiment of the multi-variate alert generator in use with the trend performance analysis tool. In this embodiment, the multi-variate alert generator 28 is implemented with the tracker 54. As mentioned earlier, the tracker 54 addresses drifting data sets that arise from changing environments. In this embodiment, the tracker 54 operates in the same manner described with reference to FIGS. 8–9. In particular, the tracker 54 tracks slow drifts that arise from normal wear patterns, while retaining the ability to classify incoming data into the different clusters.

It is therefore apparent that there has been provided in accordance with the present invention, a system and method for generating alerts through multi-variate assessment that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A system for generating an alert from data obtained from a process, comprising:
    a normalizer for normalizing the data;
    a classifier for classifying the normalized data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of alert conditions in the process; and
    an alert verifier for verifying data classified as an alert condition.

2. The system according to claim 1, wherein said normalizer comprises means for scaling the data according to normalization parameters.

3. The system according to claim 1, wherein the normal cluster and the at least one alert cluster are of non-uniform and non-linear degrading size and shape.

4. The system according to claim 3, wherein boundaries between the normal cluster and the at least one alert cluster are non crisp.

5. The system according to claim 4, wherein the shape of the normal cluster and the at least one alert cluster in the multi-dimensional variable space is an irregularly shaped hyper-ellipsoid.

6. The system according to claim 1, wherein the classification of normalized data into the normal cluster and the at least one alert cluster is based on the degree of confidence that the data belong to the normal cluster and the at least one alert cluster.

7. The system according to claim 1, wherein the alert condition is representative of at least one of a failure, a fault condition, or symptoms of an incipient failure condition.

8. The system according to claim 1, wherein said alert verifier comprises means for generating a vigilance level flag after a suspicious data reading, the vigilance level flag increasing as the number of consecutive suspicious data reading increases.

9. The system according to claim 8, wherein said alert verifier verifies an alert condition after a predetermined number of vigilance level flags have been generated.

10. A system for generating an alert from data obtained from an aircraft engine process, comprising:
    a normalizer for normalizing data obtained from said aircraft engine process;
    a classifier for classifying the normalized data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and
    an alert verifier for verifying data classified as an alert condition.

11. The system according to claim 10, wherein said normalizer comprises means for scaling the data according to normalization parameters.

12. The system according to claim 10, wherein the normal cluster and the at least one alert cluster are of non-uniform and non-linear degrading size and shape.

13. The system according to claim 12, wherein boundaries between the normal cluster and the at least one alert cluster are non crisp.

14. The system according to claim 13, wherein the shape of the normal cluster and the at least one alert cluster in the multi-dimensional variable space is an irregularly shaped hyper-ellipsoid.

15. The system according to claim 10, wherein the classification of normalized data into the normal cluster and the at least one alert cluster is based on the degree of confidence that the data belong to the normal cluster and the at least one alert cluster.

16. The system according to claim 10, wherein the alert condition is representative of at least one of a failure, a fault condition, or symptoms of an incipient failure condition.

17. The system according to claim 10, wherein the alert verifier comprises means for generating a vigilance level flag after a suspicious data reading, the vigilance level flag increasing as the number of consecutive suspicious data reading increases.

18. The system according to claim 17, wherein said alert verifier verifies an alert condition after a predetermined number of vigilance level flags have been generated.

19. The system according to claim 10, wherein the multi-dimensional variable space comprises engine variables comprising delta exhaust gas temperature, fuel flow, core speed, and exhaust gas temperature divergence.

20. A method for generating an alert from data obtained from a process, comprising:
    normalizing the data;
    classifying the normalized data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of an alert condition in the process; and
    verifying the data classified as an alert condition.

21. The method according to claim 20, wherein said normalizing comprises scaling the data according to normalization parameters.

22. The method according to claim 20, wherein the normal cluster and the at least one alert cluster are of non-uniform and non-linear degrading size and shape.

23. The method according to claim 22, wherein boundaries between the normal cluster and the alert cluster are non crisp.

24. The method according to claim 23, wherein the shape of the normal cluster and the at least one alert cluster in the multi-dimensional variable space is an irregularly shaped hyper-ellipsoid.

25. The method according to claim 20, wherein the classification of normalized data into the normal cluster and the at least one cluster is based on the degree of confidence that the data belongs to the normal cluster and the at least one cluster.

26. The method according to claim 20, wherein the alert condition is representative of at least one of a failure, a fault condition, or symptoms of an incipient failure condition.

27. The method according to claim 20, wherein said verifying an alert comprises generating a vigilance level flag after a suspicious data reading, the vigilance level flag increasing as the number of consecutive suspicious data reading increases.

28. The method according to claim 27, wherein said verifying verifies an alert condition after a predetermined number of vigilance level flags have been issued.

29. A method for generating an alert from data obtained from an aircraft engine process, comprising:

normalizing the data obtained from said aircraft engine process;

classifying the normalized data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and verifying data classified as an alert condition.

30. The method according to claim 29, wherein said normalizing comprises scaling the data according to normalization parameters.

31. The method according to claim 30, wherein the normal cluster and the at least one alert cluster are of non-uniform and non-linear degrading size and shape.

32. The method according to claim 31, wherein boundaries between the normal cluster and the at least one alert cluster are non crisp.

33. The method according to claim 32, wherein the shape of the normal cluster and the at least one alert cluster in the multi-dimensional variable space is an irregularly shaped hyper-ellipsoid.

34. The method according to claim 29, wherein the classification of normalized data into the normal cluster and the at least one alert cluster is based on the degree of confidence that the data belong to the normal cluster and the at least one alert cluster.

35. The method according to claim 29, wherein the alert condition is representative of at least one of a failure, a fault condition, or symptoms of an incipient failure condition.

36. The method according to claim 29, wherein said verifying comprises generating a vigilance level flag after a suspicious data reading, the vigilance level flag increasing as the number of consecutive suspicious data reading increases.

37. The method according to claim 36, wherein said verifying verifies an alert condition after a predetermined number of vigilance level flags have been generated.

38. The method according to claim 29, wherein the multi-dimensional variable space comprises engine variables comprising delta exhaust gas temperature, fuel flow, core speed, and exhaust gas temperature divergence.

39. A system for generating an alert from data obtained from a process, comprising:

a normalizer for normalizing the data;

a tracker for tracking the normalized data for drifts that arise over time in the process;

a classifier for classifying the normalized data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of an alert condition in the process; and an alert verifier for verifying data classified as an alert condition.

40. The system according to claim 39, wherein said normalizer comprises means for scaling the data according to normalization parameters.

41. The system according to claim 39, wherein the normal cluster and the at least one alert cluster are of non-uniform and non-linear degrading size and shape.

42. The system according to claim 41, wherein boundaries between the normal cluster and the at least one alert cluster are non crisp.

43. The system according to claim 39, wherein said alert verifier comprises means for generating a vigilance level flag after a suspicious data reading, the vigilance level flag increasing as the number of consecutive suspicious data reading increases.

44. The system according to claim 43, wherein said alert verifier verifies an alert condition after a predetermined number of vigilance level flags have been generated.

45. The system according to claim 39, wherein the tracker comprises means for adapting the locations and shapes of the normal cluster and the at least one cluster in the multi-dimensional variable space in accordance with the drifting data.

46. The system according to claim 45, wherein the classifier classifies incoming data in accordance with the adapted locations and shapes of the normal cluster and the at least one alert cluster.

47. A system for generating an alert from data obtained from an aircraft engine process, comprising:

a normalizer for normalizing data obtained from said aircraft engine process;

a tracker for tracking the normalized data for drifts that arise over time in the aircraft engine process;

a classifier for classifying the data in a multi-dimensional space defined for variables in the aircraft engine process, the data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and an alert verifier for verifying data classified as an alert condition.

48. The system according to claim 47, wherein said normalizer comprises means for scaling the data according to normalization parameters.

49. The system according to claim 47, wherein the normal cluster and the at least one alert cluster are of non-uniform and non-linear degrading size and shape.

50. The system according to claim 49, wherein boundaries between the normal cluster and the at least one alert cluster are non crisp.

51. The system according to claim 47, wherein the alert verifier comprises means for generating a vigilance level flag after a suspicious data reading, the vigilance level flag increasing as the number of consecutive suspicious data reading increases.

52. The system according to claim 51, wherein said alert verifier verifies an alert condition after a predetermined number of vigilance level flags have been generated.

53. The system according to claim 47, wherein the multi-dimensional variable space comprises engine variables comprising delta exhaust gas temperature, fuel flow, core speed, and exhaust gas temperature divergence.

54. The system according to claim 47, wherein the tracker comprises means for adapting the locations and shapes of the normal cluster and the at least one cluster in the multi-dimensional variable space in accordance with the drifting data.

55. The system according to claim 54, wherein the classifier classifies incoming data in accordance with the adapted locations and shapes of the normal cluster and the at least one alert cluster.

56. A method for generating an alert from data obtained from a process, comprising:

normalizing the data;

tracking the normalized data for drifts that arise over time in the process;

classifying the data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of an alert condition in the process; and verifying the data classified as an alert condition.

57. The method according to claim 56, wherein said normalizing comprises scaling the data according to normalization parameters.

58. The method according to claim 56, wherein the normal cluster and the at least one alert cluster are of non-uniform and non-linear degrading size and shape.

59. The method according to claim 58, wherein boundaries between the normal cluster and the at least one alert cluster are non crisp.

60. The method according to claim 56, wherein said verifying an alert comprises generating a vigilance level flag after a suspicious data reading, the vigilance level flag increasing as the number of consecutive suspicious data reading increases.

61. The method according to claim 60, wherein said verifying verifies an alert condition after a predetermined number of vigilance level flags have been issued.

62. The method according to claim 56, wherein said tracking comprises adapting the locations and shapes of the normal cluster and the at least one cluster in the multi-dimensional variable space in accordance with the drifting data.

63. The method according to claim 62, wherein said classifying classifies incoming data in accordance with the adapted locations and shapes of the normal cluster and the at least one alert cluster.

64. A method for generating an alert from data obtained from an aircraft engine process, comprising:

normalizing data obtained from said aircraft engine process;

tracking the normalized data for drifts that arise over time in the aircraft engine process;

classifying the data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and verifying data classified as an alert condition.

65. The method according to claim 64, wherein said normalizing comprises scaling the data according to normalization parameters.

66. The method according to claim 64, wherein the normal cluster and the at least one alert cluster are of non-uniform and non-linear degrading size and shape.

67. The method according to claim 66, wherein boundaries between the normal cluster and the at least one alert cluster are non crisp.

68. The method according to claim 64, wherein said verifying comprises generating a vigilance level flag after a suspicious data reading, the vigilance level flag increasing as the number of consecutive suspicious data reading increases.

69. The method according to claim 68, wherein said verifying verifies an alert condition after a predetermined number of vigilance level flags have been generated.

70. The method according to claim 64, wherein the multi-dimensional variable space comprises engine variables comprising delta exhaust gas temperature, fuel flow, core speed, and exhaust gas temperature divergence.

71. The method according to claim 64, wherein said tracking comprises adapting the locations and shapes of the normal cluster and the at least one cluster in the multi-dimensional variable space in accordance with the drifting data.

72. The method according to claim 71, wherein said classifying classifies incoming data in accordance with the adapted locations and shapes of the normal cluster and the at least one alert cluster.

73. A system for validating an alert generated from a trend performance analysis tool used to monitor data obtained from a process, comprising:

a normalizer for normalizing the data monitored by the trend performance analysis tool;

a classifier for classifying the normalized data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of alert conditions in the process; and an alert verifier for verifying data classified as an alert condition, wherein the verified alert condition is an indication that the alert generated from the trend performance analysis tool is valid.

74. The system according to claim 73, wherein said normalizer comprises means for scaling the data according to normalization parameters.

75. The system according to claim 73, wherein the normal cluster and the at least one alert cluster are of non-uniform and non-linear degrading size and shape.

76. The system according to claim 75, wherein boundaries between the normal cluster and the at least one alert cluster are non crisp.

77. The system according to claim 73, wherein the classification of normalized data into the normal cluster and the at least one alert cluster is based on the degree of confidence that the data belong to the normal cluster and the at least one alert cluster.

78. The system according to claim 73, wherein said alert verifier comprises means for generating a vigilance level flag after a suspicious data reading, the vigilance level flag increasing as the number of consecutive suspicious data reading increases.

79. The system according to claim 78, wherein said alert verifier verifies an alert condition after a predetermined number of vigilance level flags have been generated.

80. A system for validating an alert generated from a trend performance analysis tool used to monitor data obtained from an aircraft engine process, comprising:

a normalizer for normalizing data obtained from said aircraft engine process and monitored by the trend performance analysis tool;

a classifier for classifying the normalized data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and an alert verifier for verifying data classified as an alert condition, wherein the verified alert condition is an indication that the alert generated from the trend performance analysis tool is valid.

81. The system according to claim 80, wherein said normalizer comprises means for scaling the data according to normalization parameters.

82. The system according to claim 80, wherein the normal cluster and the at least one alert cluster are of non-uniform and non-linear degrading size and shape.

83. The system according to claim 82, wherein boundaries between the normal cluster and the at least one alert cluster are non crisp.

84. The system according to claim 80, wherein the classification of normalized data into the normal cluster and the at least one alert cluster is based on the degree of confidence that the data belong to the normal cluster and the at least one alert cluster.

85. The system according to claim 80, wherein the alert verifier comprises means for generating a vigilance level flag after a suspicious data reading, the vigilance level flag increasing as the number of consecutive suspicious data reading increases.

86. The system according to claim 85, wherein said alert verifier verifies an alert condition after a predetermined number of vigilance level flags have been generated.

87. A method for validating an alert generated from a trend performance analysis tool used to monitor data obtained from a process, comprising:

normalizing the data monitored by the trend performance analysis tool;

classifying the normalized data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of an alert condition in the process; and verifying the data classified as an alert condition, wherein the verified alert condition is an indication that the alert generated from the trend performance analysis tool is valid.

88. The method according to claim 87, wherein said normalizing comprises scaling the data according to normalization parameters.

89. The method according to claim 87, wherein the normal cluster and the at least one alert cluster are of non-uniform and non-linear degrading size and shape.

90. The method according to claim 89, wherein boundaries between the normal cluster and the alert cluster are non crisp.

91. The method according to claim 87, wherein the classification of normalized data into the normal cluster and the at least one alert cluster is based on the degree of confidence that the data belongs to the normal cluster and the at least one cluster.

92. The method according to claim 87, wherein said verifying an alert comprises generating a vigilance level flag after a suspicious data reading, the vigilance level flag increasing as the number of consecutive suspicious data reading increases.

93. The method according to claim 92, wherein said verifying verifies an alert condition after a predetermined number of vigilance level flags have been issued.

94. A method for validating an alert generated from a trend performance analysis tool used to monitor data obtained from an aircraft engine process, comprising:

normalizing the data obtained from said aircraft engine process and monitored by the trend performance analysis tool;

classifying the normalized data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and verifying data classified as an alert condition, wherein the verified alert condition is an indication that the alert generated from the trend performance analysis tool is valid.

95. The method according to claim 94, wherein said normalizing comprises scaling the data according to normalization parameters.

96. The method according to claim 94, wherein the normal cluster and the at least one alert cluster are of non-uniform and non-linear degrading size and shape.

97. The method according to claim 96, wherein boundaries between the normal cluster and the at least one alert cluster are non crisp.

98. The method according to claim 94, wherein the classification of normalized data into the normal cluster and the at least one alert cluster is based on the degree of confidence that the data belong to the normal cluster and the at least one alert cluster.

99. The method according to claim 94, wherein said verifying comprises generating a vigilance level flag after a suspicious data reading, the vigilance level flag increasing as the number of consecutive suspicious data reading increases.

100. The method according to claim 99, wherein said verifying verifies an alert condition after a predetermined number of vigilance level flags have been generated.

101. A system for validating an alert generated from a trend performance analysis tool used to monitor data obtained from a process, comprising:

a normalizer for normalizing the data monitored by the trend performance analysis tool;

a tracker for tracking the normalized data for drifts that arise over time in the process;

a classifier for classifying the normalized data in a multi-dimensional space defined for variables in the process, the normalized data being classified into a normal cluster and at least one alert cluster defined in the multi-dimensional variable space, wherein each cluster has a boundarY between each other and the normal cluster is indicative of normal operating conditions for the process and the at least one alert cluster is indicative of alert conditions in the process; and an alert verifier for verifying data classified as an alert condition, wherein the verified alert condition is an indication that the alert generated from the trend performance analysis tool is valid.

102. The system according to claim 101, wherein said normalizer comprises means for scaling the data according to normalization parameters.

103. The system according to claim 101, wherein the normal cluster and the at least one alert cluster are of non-uniform and non-linear degrading size and shape.

104. The system according to claim 103, wherein boundaries between the normal cluster and the at least one alert cluster are non crisp.

105. The system according to claim 101, wherein said alert verifier comprises means for generating a vigilance level flag after a suspicious data reading, the vigilance level flag increasing as the number of consecutive suspicious data reading increases.

106. The system according to claim 105, wherein said alert verifier verifies an alert condition after a predetermined number of vigilance level flags have been generated.

107. The system according to claim 101, wherein the tracker comprises means for adapting the locations and shapes of the normal cluster and the at least one cluster in the multi-dimensional variable space in accordance with the drifting data.

108. The system according to claim 107, wherein the classifier classifies incoming data in accordance with the adapted locations and shapes of the normal cluster and the at least one alert cluster.

109. A system for validating an alert generated from a trend performance analysis tool used to monitor data obtained from an aircraft engine process, comprising:

a normalizer for normalizing data obtained from said aircraft engine process and monitored by the trend performance analysis tool;

a tracker for tracking the normalized data for drifts that arise over time in the process;

a classifier for classifying the normalized data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and an alert verifier for verifying data classified as an alert condition, wherein the verified alert condition is an indication that the alert generated from the trend performance analysis tool is valid.

110. The system according to claim 109, wherein said normalizer comprises means for scaling the data according to normalization parameters.

111. The system according to claim 109, wherein the normal cluster and the at least one alert cluster are of non-uniform and non-linear degrading size and shape.

112. The system according to claim 111, wherein boundaries between the normal cluster and the at least one alert cluster are non crisp.

113. The system according to claim 109, wherein the alert verifier comprises means for generating a vigilance level flag after a suspicious data reading, the vigilance level flag increasing as the number of consecutive suspicious data reading increases.

114. The system according to claim 113, wherein said alert verifier verifies an alert condition after a predetermined number of vigilance level flags have been generated.

115. The system according to claim 109, wherein the tracker comprises means for adapting the locations and shapes of the normal cluster and the at least one cluster in the multi-dimensional variable space in accordance with the drifting data.

116. The system according to claim 115, wherein the classifier classifies incoming data in accordance with the adapted locations and shapes of the normal cluster and the at least one alert cluster.

117. A method for validating an alert generated from a trend performance analysis tool used to monitor data obtained from a process, comprising:

normalizing the data monitored by the trend performance analysis tool;

tracking the normalized data for drifts that arise over time in the process;

classifying the normalized data in a multi-dimensional space defined for variables in the process, the normalized data being classified into a normal cluster and at least one alert cluster defined in the multi-dimensional variable space, wherein each cluster has a boundary between each other and the normal cluster is indicative of normal operating conditions for the process and the at least one alert cluster is indicative of an alert condition in the process; and verifying the data classified as an alert condition, wherein the verified alert condition is an indication that the alert generated from the trend performance analysis tool is valid.

118. The method according to claim 117, wherein said normalizing comprises scaling the data according to normalization parameters.

119. The method according to claim 117, wherein the normal cluster and the at least one alert cluster are of non-uniform and non-linear degrading size and shape.

120. The method according to claim 119, wherein boundaries between the normal cluster and the alert cluster are non crisp.

121. The method according to claim 117, wherein said verifying an alert comprises generating a vigilance level flag after a suspicious data reading, the vigilance level flag increasing as the number of consecutive suspicious data reading increases.

122. The method according to claim 121, wherein said verifying verifies an alert condition after a predetermined number of vigilance level flags have been issued.

123. The method according to claim 117, wherein said tracking comprises adapting the locations and shapes of the normal cluster and the at least one cluster in the multi-dimensional variable space in accordance with the drifting data.

124. The method according to claim 123, wherein said classifying classifies incoming data in accordance with the adapted locations and shapes of the normal cluster and the at least one alert cluster.

125. A method for validating an alert generated from a trend performance analysis tool used to monitor data obtained from an aircraft engine process, comprising:

normalizing the data obtained from said aircraft engine process and monitored by the trend performance analysis tool;

tracking the normalized data for drifts that arise over time in the process;

classifying the normalized data in a multi-dimensional space defined for variables in the aircraft engine process, the normalized data being classified into a normal cluster and at least one alert cluster defined in the multi-dimensional variable space, wherein each cluster has a boundary between each other and the normal cluster is indicative of normal operating conditions for said aircraft engine process and the at least one alert cluster is indicative of an alert condition for said aircraft engine process; and verifying data classified as an alert condition, wherein the verified alert condition is an indication that the alert generated from the trend performance analysis tool is valid.

126. The method according to claim 125, wherein said normalizing comprises scaling the data according to normalization parameters.

127. The method according to claim 125, wherein the normal cluster and the at least one alert cluster are of non-uniform and non-linear degrading size and shape.

128. The method according to claim 127, wherein boundaries between the normal cluster and the at least one alert cluster are non crisp.

129. The method according to claim 125, wherein said verifying comprises generating a vigilance level flag after a suspicious data reading, the vigilance level flag increasing as the number of consecutive suspicious data reading increases.

130. The method according to claim 129, wherein said verifying verifies an alert condition after a predetermined number of vigilance level flags have been generated.

131. The method according to claim 125, wherein said tracking comprises adapting the locations and shapes of the normal cluster and the at least one cluster in the multi-dimensional variable space in accordance with the drifting data.

132. The method according to claim 131, wherein said classifying classifies incoming data in accordance with the adapted locations and shapes of the normal cluster and the at least one alert cluster.

* * * * *